(12) United States Patent
Bourgeois

(10) Patent No.: US 12,220,087 B2
(45) Date of Patent: Feb. 11, 2025

(54) LID HANDLING DEVICE

(71) Applicant: Serge Bourgeois, Lakeville-Westmorland (CA)

(72) Inventor: Serge Bourgeois, Lakeville-Westmorland (CA)

( * ) Notice: Subject to any disclaimer, the term of this patent is extended or adjusted under 35 U.S.C. 154(b) by 431 days.

(21) Appl. No.: 17/370,056

(22) Filed: Jul. 8, 2021

(65) Prior Publication Data
US 2022/0022698 A1    Jan. 27, 2022

(30) Foreign Application Priority Data
Jul. 23, 2020  (CA) .................................. 3087755

(51) Int. Cl.
| | | |
|---|---|---|
| A47J 45/10 | (2006.01) | |
| A46B 15/00 | (2006.01) | |
| A47J 37/07 | (2006.01) | |
| A47J 43/28 | (2006.01) | |
| B25G 1/10 | (2006.01) | |

(52) U.S. Cl.
CPC ........... *A47J 45/10* (2013.01); *A46B 15/0055* (2013.01); *A47J 37/0786* (2013.01); *A47J 43/288* (2013.01); *A46B 2200/3073* (2013.01); *B25G 1/102* (2013.01)

(58) Field of Classification Search
CPC ...... A47J 45/10; A47J 37/0786; A47J 43/288; A46B 15/0055; A46B 2200/3073; B25G 1/102
USPC ..................... 7/110; 294/2, 12, 26
See application file for complete search history.

(56) References Cited

U.S. PATENT DOCUMENTS

| | | | | |
|---|---|---|---|---|
| 33,587 | A * | 10/1861 | Taplin | A47J 45/10 294/12 |
| 59,058 | A * | 10/1866 | Oakey | A47G 21/06 294/12 |
| 163,659 | A * | 5/1875 | Hoyt | B25J 15/0616 294/12 |
| 172,607 | A * | 1/1876 | Carpenter | B25J 15/0616 74/543 |
| 904,346 | A * | 11/1908 | Meehan | A47J 45/10 294/12 |
| 2,739,330 | A * | 3/1956 | Leo | F16B 2/065 15/176.3 |
| 2,992,848 | A * | 7/1961 | Livensparger | A47J 45/10 294/34 |
| 4,658,455 | A * | 4/1987 | Skillern | E06C 7/14 7/105 |
| 6,039,372 | A * | 3/2000 | Noe | A47J 37/0786 294/27.1 |
| D477,523 | S * | 7/2003 | Malvasio | D8/105 |
| 7,108,304 | B2 * | 9/2006 | White | F24B 15/002 294/12 |
| 7,572,024 | B2 * | 8/2009 | Ko | A47J 37/0786 126/213 |
| 9,016,170 | B2 * | 4/2015 | Nelson | B67B 7/18 7/151 |
| 9,149,157 | B2 * | 10/2015 | Caplan | A47J 45/10 |

\* cited by examiner

*Primary Examiner* — Hadi Shakeri
(74) *Attorney, Agent, or Firm* — Bonini IP Law, LLC; Frank J. Bonini, Jr.

(57) ABSTRACT

A lid handling device for assisting handling of a lid is provided. The lid handling device comprises an elongated body. A handle interacting structure is disposed at a first end portion of the elongated body. The handle interacting structure is adapted for interacting with a handle of the lid.

13 Claims, 4 Drawing Sheets

LID HANDLING DEVICE

FIELD OF THE INVENTION

The present invention relates to barbeque and kitchen accessories, and more particularly to a lid handling device for assisting handling of barbeque lids and pot lids.

BACKGROUND OF THE INVENTION

Present-day barbeques for personal use typically have a barbeque lid for covering the grill that is pivotally movable mounted to a rear portion of the barbeque behind the grill. For opening/closing the barbeque lid, a user holds the handle mounted to a front end of the barbeque lid and pivotally moves the barbeque lid between a closed position with the handle being easily reachable placed at the front of the barbeque and an open position with the handle being placed in proximity to the rear of the barbeque and a substantial distance above the grill making it difficult to reach. In order to reach the handle in the open position the user has to lean over the grill and reach the handle with a hand, thus exposing the arm and upper body of the user to heat and smoke rising from the grill during opening/closing of the barbeque lid.

A similar problem arises when opening/closing a pot lid, in particular, when the pot is of larger size. In order to reach a handle or knob mounted in proximity to a centre of the pot lid for covering/uncovering the pot the user has to reach across the lid to the centre thereof, thus exposing the arm of the user to heat and steam rising from the pot for covering/uncovering the pot.

While pot holders protect a user's hand from exposure to heat when holding the handle or knob, they do not protect the user's arm.

It is desirable to provide a lid handling device for assisting handling of barbeque lids and pot lids by extending the reach of a user's arm.

It is also desirable to provide a lid handling device for assisting handling of barbeque lids that engages a handle of the barbeque lid during opening as well as during closing of the barbeque lid.

It is also desirable to provide a lid handling device for assisting handling of barbeque lids that is incorporated in a barbeque spatula or a barbeque grill brush.

It is also desirable to provide a lid handling device for assisting handling of pot lids that engages pot lid handles and/or pot lid knobs.

SUMMARY OF THE INVENTION

Accordingly, one object of the present invention is to provide a lid handling device for assisting handling of barbeque lids and pot lids by extending the reach of a user's arm.

Another object of the present invention is to provide a lid handling device for assisting handling of barbeque lids that engages a handle of the barbeque lid during opening as well as during closing of the barbeque lid.

Another object of the present invention is to provide a lid handling device for assisting handling of barbeque lids that is incorporated in a barbeque spatula or a barbeque grill brush.

Another object of the present invention is to provide a lid handling device for assisting handling of pot lids that engages pot lid handles and/or pot lid knobs.

According to one aspect of the present invention, there is provided a lid handling device for assisting handling of a lid. The lid handling device comprises an elongated body. A handle interacting structure is disposed at a first end portion of the elongated body. The handle interacting structure is adapted for interacting with a handle of the lid.

According to the aspect of the present invention, there is provided a lid handling device for assisting handling of a lid. The lid handling device comprises an elongated body. A handle interacting structure is disposed at a first end portion of the elongated body. The handle interacting structure is adapted for interacting with a handle of the lid. The handle interacting structure comprises a first handle interacting element and a second handle interacting element. The first handle interacting element and the second handle interacting element protrude from a same side of the first end portion of the elongated body. The first handle interacting element and the second handle interacting element are spaced apart a predetermined distance along the body. Each of the first handle interacting element and the second handle interacting element is shaped forming a hook such that the hooks are facing each other.

According to the aspect of the present invention, there is provided a lid handling device for assisting handling of a lid. The lid handling device comprises an elongated body. A handle interacting structure is disposed at a first end portion of the elongated body. The handle interacting structure is adapted for interacting with a handle of the lid. The handle interacting structure comprises a first handle interacting element and a second handle interacting element. The first handle interacting element and the second handle interacting element protrude from a same side of the first end portion of the elongated body. The first handle interacting element and the second handle interacting element are spaced apart a predetermined distance along the body. The first handle interacting element and the second handle interacting element are adapted for accommodating a bottom portion of a knob-type handle of the lid therebetween and for interacting with a top portion of the handle.

According to the aspect of the present invention, there is provided a lid handling device for assisting handling of a lid. The lid handling device comprises an elongated body. A handle interacting structure is disposed at a first end portion of the elongated body. The handle interacting structure is adapted for interacting with a handle of the lid. The lid handling device further comprises a tool structure extending from the first end portion of the elongated body. The tool structure comprises one of a spatula and a brush.

The advantage of the present invention is that it provides a lid handling device for assisting handling of barbeque lids and pot lids by extending the reach of a user's arm.

A further advantage of the present invention is that it provides a lid handling device for assisting handling of barbeque lids that engages a handle of the barbeque lid during opening as well as during closing of the barbeque lid.

A further advantage of the present invention is that it provides a lid handling device for assisting handling of barbeque lids that is incorporated in a barbeque spatula or a barbeque grill brush.

A further advantage of the present invention is that it provides a lid handling device for assisting handling of pot lids that engages pot lid handles and/or pot lid knobs.

BRIEF DESCRIPTION OF THE DRAWINGS

A preferred embodiment of the present invention is described below with reference to the accompanying drawings, in which.

DESCRIPTION OF THE PREFERRED EMBODIMENT

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

Figure 1A:
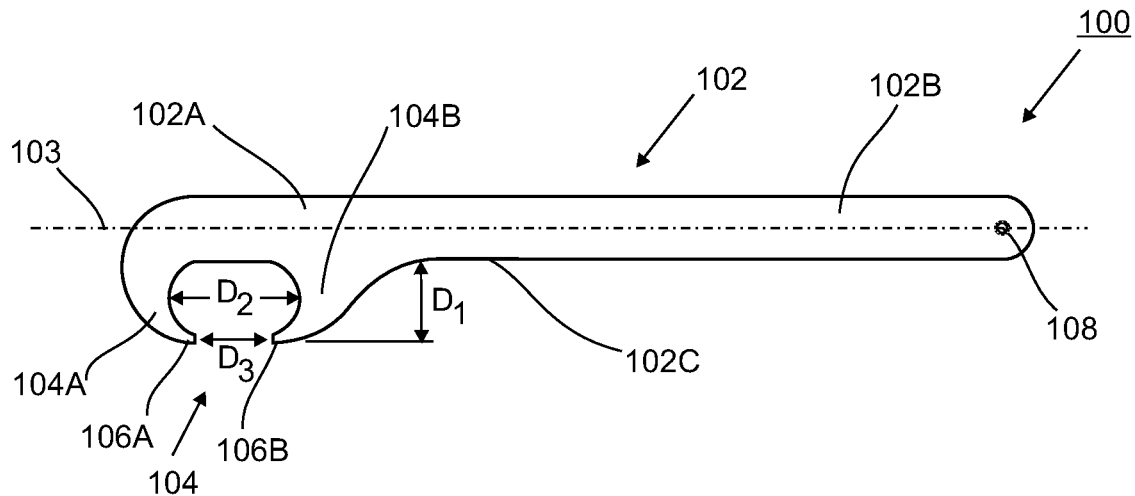
FIGS. 1a and 1b are simplified block diagrams illustrating in a top view and a side view, respectively, a lid handling device according to a preferred embodiment of the invention.
Figure 1B:
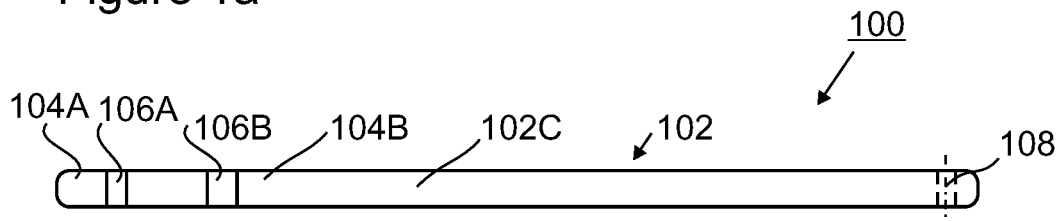
Figure 1C:
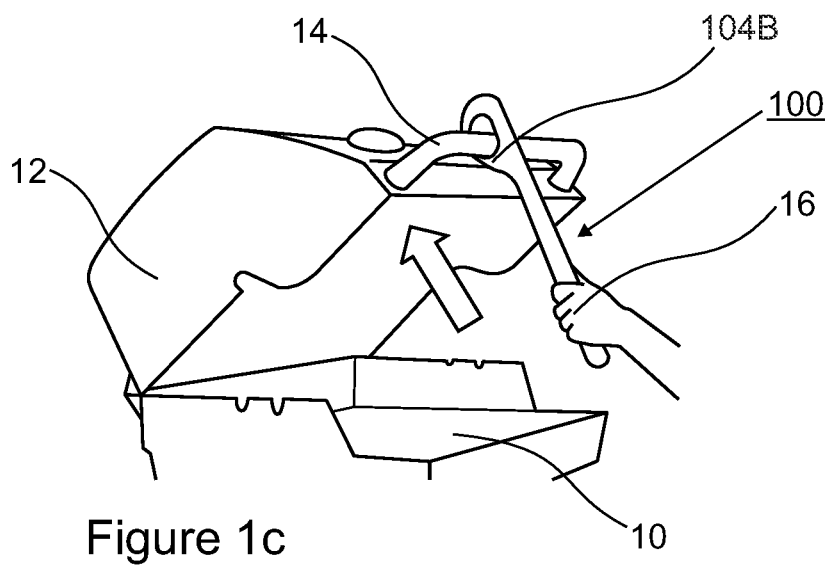
FIGS. 1c and 1d are simplified block diagrams illustrating in perspective side views employment of the lid handling device according to the preferred embodiment of the invention for opening and closing a barbeque lid, respectively.
Figure 1D:
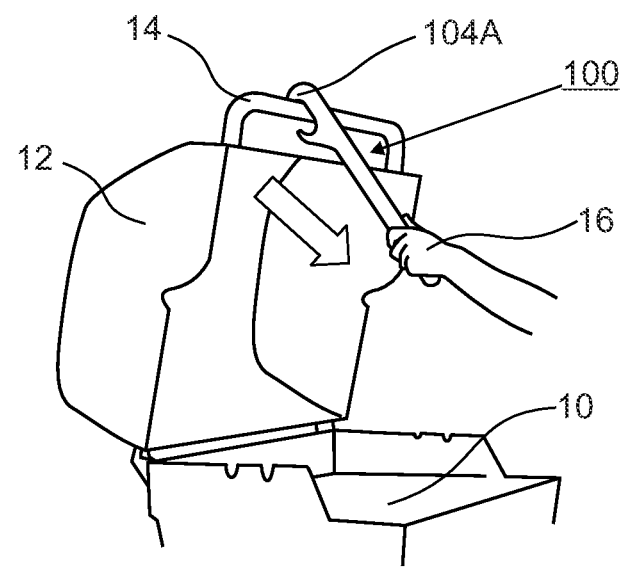

Referring to FIGS. 1a to 1e, a lid handling device 100 according to a preferred embodiment of the invention is provided. The lid handling device 100 comprises an elongated body 102 and a handle interacting structure 104. The handle interacting structure 104 is disposed at a first end portion 102A of the elongated body 102 and is adapted for interacting with handle 14 of lid 12, as illustrated in FIGS. 1c and 1d and described hereinbelow.

Preferably, the handle interacting structure 104 comprises a first handle interacting element 104A and a second handle interacting element 104B. The first handle interacting element 104A and the second handle interacting element 104B protrude a predetermined distance D1 from a same side 102C of the first end portion 102A of the elongated body 102 and are spaced apart a predetermined distance D2 along the body 102, i.e. along longitudinal axis 103.

Further preferably, each of the first handle interacting element 104A and the second handle interacting element 104B is shaped forming a hook such that the hooks are facing each other with hook tips 106A and 106B being spaced apart a predetermined distance D3. For example, the handle interacting structure 104 is adapted for interacting with the handle 14 of the lid 12 of a large variety of commercially available barbeque grills 10 with: distance D1 being approximately 40 mm; distance D2 being approximately 75 mm; and distance D3 being approximately 40 mm.

For opening the lid 12 the handle interacting structure 104 is moved over the handle 14 with the same passed between the hook tips 106A and 106B of the first handle interacting element 104A and the second handle interacting element 104B, respectively. After passing the handle 14 between the hook tips 106A and 106B, the lid handling device 100 is pushed upward and the second handle interacting element 104B interacting with the handle 14 moves the front end of the lid upward towards the open position, as indicated by the block arrow in FIG. 1c.

Similarly, for closing the lid 12 the handle interacting structure 104 is moved over the handle 14 with the same passed between the hook tips 106A and 106B of the first handle interacting element 104A and the second handle interacting element 104B, respectively. After passing the handle 14 between the hook tips 106A and 106B, the lid handling device 100 is pulled downward and the first handle interacting element 104A interacting with the handle 14 moves the front end of the lid downward towards the closed position, as indicated by the block arrow in FIG. 1d.

Use of the lid handling device 100 substantially increases the reach of the user's hand 16 when opening and closing the barbeque lid 12, thus obviating the user having to lean over the grill 10 to reach the handle and preventing exposure of the user's arm and upper body to heat and smoke rising from the grill during opening and closing of the barbeque lid 12.

The lid handling device 100 has, for example, an overall length along the longitudinal axis 103 of approximately 450 mm. The lid handling device 100 is made of conventional materials such as, for example, hardwood, stainless steel, or plastic composite material, using conventional manufacturing methods used in the production of kitchen accessories. Width and thickness of the elongated body are determined depending on the material used to provide sufficient rigidity, in particular, for pushing the lid into the open position.

Preferably, aperture 108 is disposed in the second end portion 102B of the elongated body 102 for enabling hanging of the lid handling device 100 by directly engaging the aperture 108 with a hook, or for accommodating a portion of, for example, a rope forming a loop, therein.

Optionally, the second end portion 102B of the elongated body 102 is ergonomically shaped to provide, for example, improved grip when holding the lid handling device 100.

Alternatively, the handle interacting structure 104 comprises a single handle interacting element forming two hooks with the hook tips facing in opposite directions. In use, the hook with the hook tip facing towards the second end portion 102B of the elongated body 102 is employed for closing the lid 12 while the hook with the hook tip facing in the opposite direction is used for opening the lid 12.

Figure 1E:
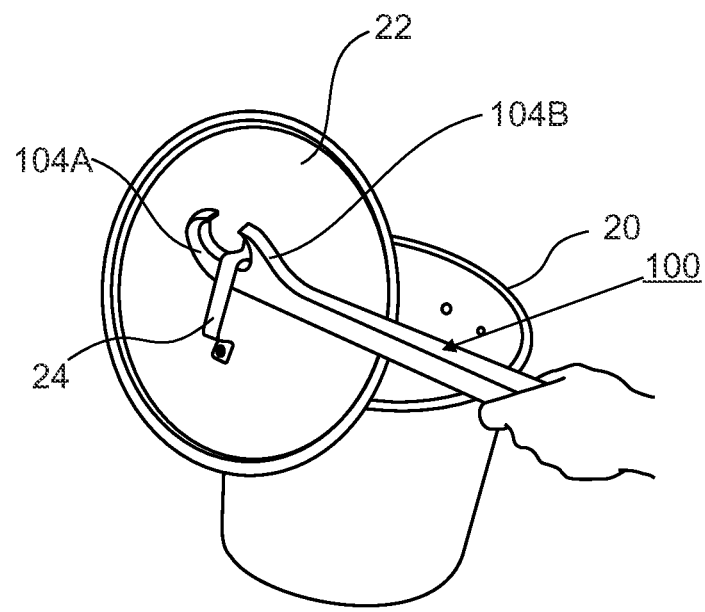
FIG. 1e is a simplified block diagram illustrating in a perspective top view employment of the lid handling device according to the preferred embodiment of the invention for opening and closing a pot lid.

The lid handling device 100 may also be employed for opening and closing the lid 22 of a pot 20, as illustrated in FIG. 1e. Here the handle interacting structure 104 is designed for pushing the first handle interacting element 104A through an opening between the handle 24 and the pot lid 22. With the handle 24 being securely placed between the first handle interacting element 104A and the second handle interacting element 104B, the pot lid 22 is easily opened and closed without exposing the user's hand and arm to heat and steam rising from the pot 20.

Figure 2A:
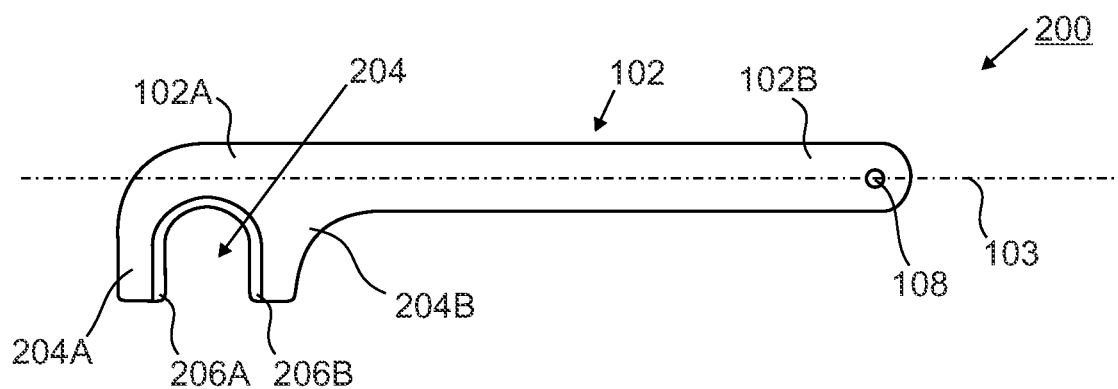
FIGS. 2a and 2b are simplified block diagrams illustrating in a top view and a side view, respectively, a lid handling device according to another preferred embodiment of the invention.
Figure 2B:
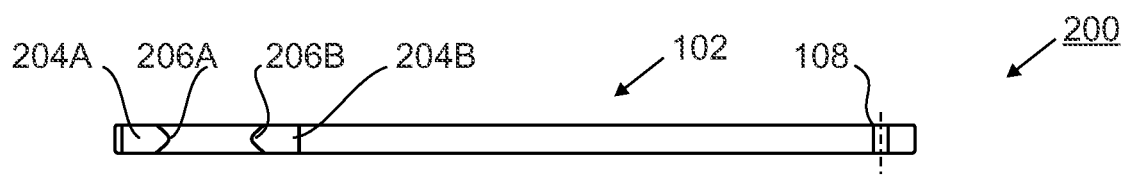
Figure 2C:
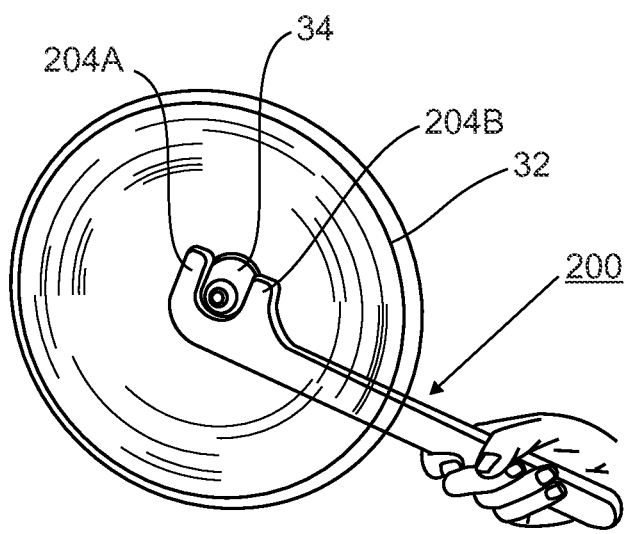
FIG. 2c is a simplified block diagram illustrating in a perspective side view employment of the lid handling device according to the other preferred embodiment of the invention for opening and closing a pot lid having a knob-type handle; and, FIGS. 3a and 3b are simplified block diagrams illustrating in top views a lid handling device according to yet another preferred embodiment of the invention with the lid handling device comprising an additional tool structure.

Referring to FIGS. 2a to 2c, a lid handling device 200 according to another preferred embodiment of the invention is provided. The lid handling device 200 comprises the same elongated body 102 as the lid handling device 100 with same reference numerals used to refer to same components. Here, handle interacting structure 204 comprises first handle interacting element 204A and second handle interacting element 204B with the same being adapted for accommodating a bottom portion of a knob-type handle 34 of the pot lid 32 therebetween and for interacting with a top portion of the knob-type handle 34. Preferably, the handle engaging portions of the first handle interacting element 204A and the second handle interacting element 204B comprise chamfers 206A and 206B, respectively, for facilitating engagement of the lid handling device 100 with the bottom portion of the knob-type handle 34. With the knob-type handle 34 being securely placed between the first handle interacting element 204A and the second handle interacting element 204B, the pot lid 32 is easily opened and closed without exposing the user's hand and arm to heat and steam rising from the pot.

Figure 3A:
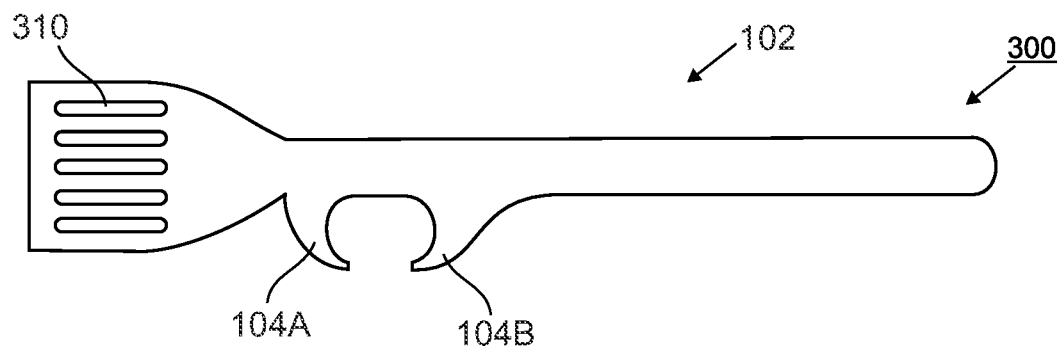
Figure 3B:
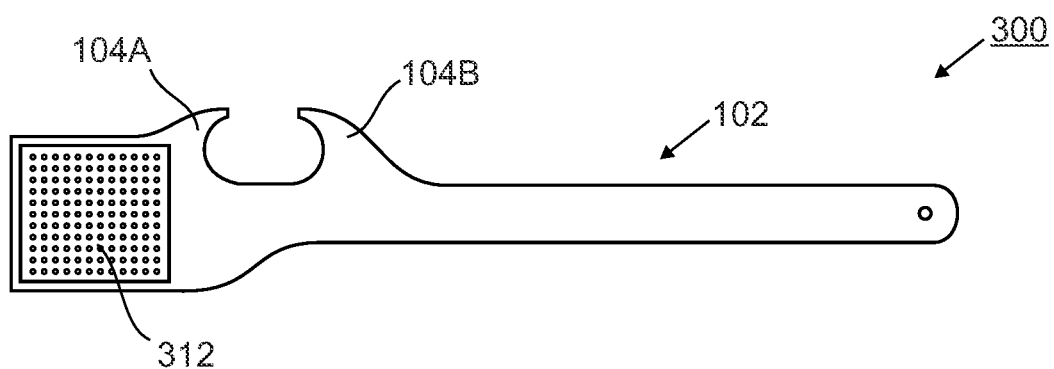

Referring to FIGS. 3a and 3b, a lid handling device 300 according to yet another preferred embodiment of the invention is provided. The lid handling device 300 comprises the same elongated body 102 as the lid handling device 100 with same reference numerals used to refer to same components. The lid handling device 300 further comprises a tool structure such as, for example, a spatula 310, or a brush 312 extending from the first end portion 102A of the elongated body 102, thus providing a multi-use device.

The lid handling device 300 is made, for example, as a single unit comprising both, the handle interacting elements 104A, 104B, as well as the tool structure 310, 312. Alternatively, the interacting elements 104A, 104B and the tool structure 310, 312 are made in separate units which are mounted together in a conventional manner using, for example, an adhesive.

The present invention has been described herein with regard to preferred embodiments. However, it will be obvious to persons skilled in the art that a number of variations and modifications can be made without departing from the scope of the invention as described herein.

What is claims is:

1. A lid handling device for assisting handling of a lid comprising:
    an elongated body having a substantial length between a first end portion and a second end portion thereof, the second end portion for holding the elongated body; and,
    a first handle interacting element fixedly and directly protruding from a first side of the elongated body at a first location of the first end portion and a second handle interacting element fixedly and directly protruding from the first side of the elongated body at a second location of the first end portion with the first location and the second location being spaced along a longitudinal axis of the elongated body such that the first handle interacting element and the second handle interacting element are in respective fixed positions spaced apart a predetermined distance along the longitudinal axis of the elongated body for forming a single void therebetween and such that a handle of the lid is enabled to pass between the first handle interacting element and the second handle interacting element;
    wherein each of the first handle interacting element and the second handle interacting element is shaped forming a hook such that the hooks are facing each other and define a maximum space for said single void, wherein the hooks comprise tips facing each other that are spaced apart defining a minimum space for said single void that is smaller than said maximum space such that the handle is enabled to pass therebetween in a direction oriented substantially perpendicular to the longitudinal axis
    wherein the tip at the first location of the first end portion has a dimension extending along said longitudinal axis that is smaller than a dimension along the longitudinal extension of the tip at the second location of the first end portion, wherein the tip at the second location of the first end portion is closer to the second end portion; and
    a tool structure extending from the first end portion of the elongated body.

2. The device according to claim 1 wherein the first handle interacting element is adapted for pushing through an opening between the handle and a lid of a pot.

3. The device according to claim 2 wherein the first handle interacting element and the second handle interacting element comprise walls facing each other and being oriented substantially perpendicular to the longitudinal axis.

4. The device according to claim 3 wherein the walls form chamfers.

5. The device according to claim 1 wherein the tool structure comprises one of a spatula and a brush.

6. The device according to claim 1 wherein the first handle interacting element and the second handle interacting element protrude a predetermined distance from the longitudinal axis, and wherein the elongated body is generally straight between a first end and a second end thereof, and wherein the elongated body has a straight first side that is generally oriented parallel to the longitudinal axis of the elongated body.

7. The device according to claim 1 wherein the elongated body has an overall length of approximately 450 mm.

8. A method for handling a lid comprising:
    providing a lid handling device for assisting handling of the lid, the lid handling device comprising:
        an elongated body having a substantial length between a first end portion and a second end portion thereof, the second end portion for holding the elongated body; and a first handle interacting element fixedly and directly protruding from a first side of the elongated body at a first location of the first end portion and a second handle interacting element fixedly and directly protruding from the first side of the elongated body at a second location of the first end portion with the first location and the second location being spaced along a longitudinal axis of the elongated body such that the first handle interacting element and the second handle interacting element are in respective fixed positions spaced apart a predetermined distance along the longitudinal axis of the elongated body for forming a single void therebetween and such that a handle of the lid is enabled to pass between the first handle interacting element and the second handle interacting element; wherein each of the first handle interacting element and the second handle interacting element is shaped forming a hook such that the hooks are facing each other and define a maximum space for said single void, wherein the hooks comprise tips facing each other that are spaced apart defining a minimum space for said single void that is smaller than said maximum space such that the handle is enabled to pass therebetween in a direction oriented substantially perpendicular to the longitudinal axis; wherein the tip at the first location of the first end portion has a dimension extending along said longitudinal axis that is smaller than a dimension along the longitudinal extension of the tip at the second location of the first end portion, wherein the tip at the second location of the first end portion is closer to the second end portion;
    gripping the lid handling device at the second end portion of the elongated body; interfacing moving the first handle interacting element and the second handle interacting element with over the handle such that the handle is passed therebetween while holding the lid handling device at the second end portion of the elongated body; and, lifting or lowering the lid while holding the lid handling device at the second end portion of the elongated body.

9. The method according to claim 8 wherein lifting or lowering the lid comprises lifting or lowering the lid of a barbeque grill.

10. The method according to claim 8 wherein the handle is a lid handle and wherein the first handle interacting element is placed through an opening between the handle and the lid.

11. A lid handling device for assisting handling of a lid comprising:
an elongated body having a substantial length between a first end portion and a second end portion thereof, the second end portion for holding the elongated body; and,
a first handle interacting element fixedly and directly protruding from a first side of the elongated body at a first location of the first end portion and a second handle interacting element fixedly and directly protruding from the first side of the elongated body at a second location of the first end portion with the first location and the second location being spaced along a longitudinal axis of the elongated body such that the first handle interacting element and the second handle interacting element are in respective fixed positions spaced apart a predetermined distance along the longitudinal axis of the elongated body for forming a single void therebetween and such that a handle of the lid is enabled to pass between the first handle interacting element and the second handle interacting element;

wherein each of the first handle interacting element and the second handle interacting element is shaped forming a hook such that the hooks are facing each other and define a maximum space for said single void, wherein the hooks comprise tips facing each other that are spaced apart defining a minimum space for said single void that is smaller than said maximum space such that the handle is enabled to pass therebetween in a direction oriented substantially perpendicular to the longitudinal axis;

wherein the tip at the first location of the first end portion has a dimension extending along said longitudinal axis that is smaller than a dimension along the longitudinal extension of the tip at the second location of the first end portion, wherein the tip at the second location of the first end portion is closer to the second end portion; and wherein the tips are spaced apart approximately 40 mm and wherein the tips are placed approximately 40 mm from the first side of the elongated body.

12. The device according to claim 11, including a tool structure extending from the first end portion of the elongated body.

13. The device according to claim 12, wherein the tool structure comprises one of a spatula and a brush.

\* \* \* \* \*